United States Patent Office 2,693,410
Patented Nov. 2, 1954

2,693,410

SMELTING OF ZINCIFEROUS MATERIAL

Robert K. Waring and Luther D. Fetterolf, Palmerton, Pa., assignors to The New Jersey Zinc Company, New York, N. Y., a corporation of New Jersey No Drawing. Application June 2, 1953,
Serial No. 359,198

3 Claims. (Cl. 75—14)

This invention relates to the smelting of zinciferous material and, more particularly, to the smelting of such material in an electric arc furnace.

For generations the smelting of zinciferous materials, and particularly zinciferous ores, has been limited to those containing a relatively small amount of iron. In the retort process, including both the Belgian retort and its modern successor, the vertical retort, the presence of relatively large amounts of iron in the charge, such as the amount of iron in franklinite, has had a prohibitively deleterious effect upon the retort walls. Thus, many orebodies throughout the world have been considered unworkable because of their relatively high iron content.

The variety of zinciferous materials which can be smelted successfully has recently been enlarged by the development of a process for smelting moderately high-iron zinciferous materials in an electric furnace. This process, referred to as the Sterling Process and described in United States Patents Nos. 2,598,741 through 2,598,745, is not only applicable to such moderately high-iron zinciferous charges but takes advantage of their iron content to facilitate the production of a condensable zinc vapor. Thus, the Sterling Process utilizes the endothermic heat of reduction of iron oxide to buffer and control the temperature of the charge and the resulting slag. This temperature control minifies the volatilization of charge and slag components which tend to promote the condensation of the evolved zinc vapor in the form of zinc dust or blue powder rather than in the form of a molten mass.

In achieving the aforementioned temperature-controlling effect, the amount of reducing agent used in the Sterling Process is so chosen as to leave in the substantially zinc-free slag a minimum of about 1½% iron oxide (calculated as Fe). If the iron oxide content of the zinciferous material itself does not exceed about 2% by weight, extraneous iron oxide additions are made to the charge in order to insure this minimum iron oxide requirement of the slag. On the other hand, inasmuch as a metallic iron product is formed during the smelting and inasmuch as the iron product must contain at least 1½ or 2% carbon in order to remain molten at the prevailing furnace temperature which does not exceed about 1450° C., the iron oxide content of the slag in the Sterling Process must not be permitted to exceed about 6% (calculated as Fe) for otherwise the resulting excessively oxidic character of the slag causes decarburization of the iron to the extent that it is not tappable at the prevailing furnace temperature.

We have now discovered that it is possible to smelt zinciferous materials relatively high in zinc and low in iron in an electric arc furnace so as to produce a condensable zinc vapor without control of the iron oxide component of the resulting slag provided certain other conditions are maintained. Thus, we have found that zinciferous materials containing at least 50% zinc (as Zn) can be smelted in an electric arc furnace using such an amount of the reducing agent as to reduce no significant amount of the iron oxide component of the charge to molten metallic iron provided that the iron oxide content of the slag and the lime:silica ratio of these components of the slag are maintained within certain limits. By proper control of these factors in the slag composition, we have found that high grade zinciferous materials may be smelted in an electric arc furnace without any appreciable reduction of any iron oxide component to molten metallic iron.

Accordingly, the method of our present invention is directed to the smelting of an oxidic iron-bearing zinciferous material with a solid carbonaceous reducing material, the zinc content of the zinciferous material (calculated as Zn) being at least 50% by weight and the iron oxide component of the charge (calculated as Fe) constituting up to 25% by weight of the total of non-zinciferous slag-forming constituents in the charge. Our method comprises admixing the zinciferous material with an amount of the reducing material sufficient to effect reduction of at least 90% of the zinc oxide component of the zinciferous material to metallic zinc but insufficient to reduce the iron oxide to a collectible molten metallic iron product, incorporating in the charge an amount of an extraneous fluxing agent of the group consisting of lime and silica sufficient to establish in the slag-forming constituents of the charge a lime:silica ratio within the range of about 0.6:1 to 1:1. This mixture is charged to an electric arc furnace and is smelted out of direct contact with the furnace arc with the resulting production of a molten slag containing up to 25% by weight of ferrous oxide (calculated as Fe) and with evolution of a metallic zinc vapor capable of being condensed predominantly to molten zinc.

The zinciferous materials amenable to smelting pursuant to the method of our present invention include zinc ores and zinc concentrates, whether physical concentrates or pyrometallurgical concentrates. Thus, roasted zinc flotation concentrates, sintered Waelz oxide (a pyrometallurgical concentrate), refuse zinc oxide, zinciferous fume, and the like, may be treated by our process. Regardless of its source, the zinciferous material charged to the smelting operation of our invention should contain at least 50% zinc (calculated as Zn) and preferably at least 65% zinc. For example, zinc ores such as Austinville (70% Zn and 1.5–2.5% Fe), and calcined zinciferous furnace fumes (68% Zn and 0.8% Fe) may be treated effectively by our smelting method. Sintered Waelz oxide, which contains about 70% Zn, closely approximates the zinc, iron and gangue components of Austinville ore and is amenable to similar smelting treatment. Zinciferous material having a zinc content below about 50% may be enriched by the addition of a high zinc material such as zinc fume, and in this way the process of our invention lends itself to the treatment of a wide variety of zinciferous materials relatively low in contained iron oxide.

The iron oxide content of the aforementioned high zinc-content zinciferous materials is generally relatively low because the iron oxide comprises only one of a number of other non-zinciferous components which make up the small remainder of the zinciferous starting material. The iron oxide content of such zinciferous materials as may be charged to the smelting process of our invention may vary considerably, and the relationship between the amount of iron oxide and zinc in the charge is relatively unimportant. However, the iron oxide component of the charge does bear an important relationship to the non-zinciferous components of the charge in the practice of our invention. Thus we have found that the iron oxide component of the charge (including the iron oxide component of the zinciferous material and that of the ash forming constituents of the solid carbonaceous reducing material) may be any amount up to but not exceeding about 25% (calculated as Fe) by weight of the total non-zinciferous charge components. When the iron content of the slag exceeds about 25% by weight of the slag, appreciable amounts of metallic iron will be formed and will accumulate in the furnace contrary to the practice of our invention. Within the range of 5% to 25% iron oxide (calculated as Fe) in the slag, the iron oxide insures in the resulting slag a fluidity sufficient to promote adequate convection circulation in the slag for preventing objectionable local overheating in the vicinity of the furnace arcs. By preventing such local overheating of the slag, the volatilization of lime, silica and magnesia, either by reduction or direct volatilization or both, is hindered and the evolved zinc vapors are substantially free of such volatilized components which otherwise tend to promote the formation of zinc dust or blue powder in the zinc-condensing stage. When the iron oxide content of the slag is less than 5% (calculated as Fe), adequate slag fluidity is assured by use of a lime:silica ratio substantially that of the maximum within the aforementioned range of 0.6:1 to 1:1.

The presence of the aforementioned amount of iron oxide in the slag produced by the smelting operation is obtained, pursuant to our invention, by incorporating in the charge an amount of a solid carbonaceous reducing material sufficient to effect reduction of at least 90%, and preferably at least 95%, of the zinc oxide component of the zinciferous material to metallic zinc but insufficient to reduce the iron oxide to a collectible molten metallic iron product. The incidental formation of some metallic iron in the form of particles of sponge iron suspended in the slag is permissible but is of no significant importance in the process of our present invention. It is desirable, pursuant to our present discovery, to prevent the formation of any significant amount of molten iron product in a collectible or tappable form, and it is this latter iron formation which is to be avoided by control of the amount of reducing material used in practicing the invention.

The solid carbonaceous reducing material used in our present smelting process may be in any form conventionally used in metallurgical smelting operations. For example, coal and coke may be used with particular advantage and preferably in the form of particles ranging in size from a maximum of about ½ inch in diameter down to that of dust coal. The type of coal or coke used in the smelting operation must be considered in ascertaining the aforementioned iron oxide component of the charge. The iron oxide content of the coal or coke frequently comprises 5% to 10% of the total iron oxide component of the charge and cannot be ignored in calculations relating to charge composition for the practice of our invention.

The charge composition should also be controlled to establish in the slag a lime:silica ration having, within certain limits, a generally inverse relationship to the iron oxide content of the slag. The maximum lime:silica ratio which may be used with satisfactory results appears to be substantially 1:1 and the lowest ratio appears to be about 0.6:1. A high lime:silica ratio within this range not only insures adequate slag fluidity but also hinders the formation of zinc silicate at low iron oxide contents, and to the extent that the formation of zinc silicate is hindered the recovery of zinc from the charge is enhanced. On the other hand, with amounts of iron oxide in the slag approaching the upper limit of 25% (calculated as Fe), a low lime:silica ratio within the aforementioned range is advantageous in minifying a normal tendency for the iron oxide to be reduced in such relatively high iron oxide containing slags. The relationship between the optimum lime:silica ratio and the iron oxide content of the slag, therefore, is such that, as the iron oxide content nears its permissible upper limit, the lime:silica ratio should generally approach its lower limit of 0.6:1, and as the iron oxide content of the slag becomes less than about 5%, the lime:silica ratio should approach its upper limit of 1:1. When the aforesaid iron oxide content of the slag is between about 5% and 20% by weight of the slag, the lime:silica ratio may vary widely between the upper and lower limits of the ratio. Provided these general conditions are met, a maximum yield of metallic zinc with a minimum production of molten metallic iron will be obtained. Inasmuch as the iron oxide content of the charge is generally established by the nature of the zinciferous charge material, the prescribed conditions can be met, if they do not fortuitously exist by virtue of the composition of the zinciferous and reducing materials of the charge, by incorporating either extraneous lime or extraneous silica, as the case may be, in amount sufficient to establish the requisite lime:silica ratio.

Smelting of the resulting charge can be readily carried out in a conventional electric arc furnace. However, the charging procedure and the position of the electrodes should be so controlled as to substantially avoid direct contact between the furnace arcs and the unsmelted charge. For example, the charge may be delivered to the central portion of the furnace so as to float on the surface of the body of slag produced by the smelting operation, but with this type of charging the ends of the electrodes should be partially immersed in the slag body so as to maintain submerged arc conditions around the electrodes. That is, the electrodes in this type of operation should be sufficiently immersed in the slag body so that a multiplicity of relatively small arcs are formed between the immersed portion of each electrode and the slag body, as distinguished from an open arc which extends between the surface of the slag body and the end of an electrode positioned above the slag body and as further distinguished from slag resistance heating wherein the electrode is so deeply immersed in the slag body as to maintain an arcless contact between the slag and electrode. On the other hand, the charge may be delivered to the furnace predominantly through peripherally arranged openings in the furnace roof so that the charge forms a downwardly and inwardly sloping bank extending toward but out of contact with the furnace electrodes. With this latter type of charging, the electrodes may be raised sufficiently above the surface of the slag body so as to establish exposed arcs which heat the charge predominantly by radiation. In both types of operation, that is with either submerged arc or exposed arc heating, the fluidity of the slag produced by the charge composition correlation referred to hereinbefore is sufficient to promote rapid dissemination of the heat from the arc throughout the entire slag body and thus minify the development of local overheating of the slag. The fluidity of the slag produced in practicing our invention also enhances the transfer of heat from the submerged or open arcs to the charge by the physical contact between the charge and the arc-heated slag.

It will be observed that in both types of smelting operation described hereinbefore the smelting heat is imparted to the charge substantially without contact between the unsmelted charge and the furnace arcs, the heat transfer being effected either predominantly by convection through the slag or predominantly by radiation from the arc, or by a combination thereof. The power input to the furnace in either type of operation is controlled so as to prevent the development of a furnace temperature exceeding 1450° C. as measured by the temperature of the slag when tapped from the furnace. By maintaining these smelting conditions, in conjunction with the charge component correlation described hereinbefore, we have found that the zinc vapor evolved from the charge is capable of being condensed predominantly to molten zinc metal.

Condensation of the zinc vapor-bearing smelting gases produced in accordance with our invention can be readily accomplished with high efficiency. Although the zinc vapor may be effectively condensed in stationary baffle-type condensers such as that described in the United States patent to Bunce No. 1,873,861, condensation can be effected with particular advantage in a condenser of the type wherein the zinc vapor is brought into intimate contact with a relatively large freshly exposed surface of molten zinc. The latter type of condenser is represented by that wherein the zinc vapor-bearing gases are passed through a shower of molten zinc forcibly hurled through a confined condensing zone as described in United States Patents Nos. 2,457,544 through 2,457,551 and 2,494,551.

The only requirement for the physical form of charge used in practicing our invention is that it be loose and dry. By "loose" we mean that the charge should not be introduced in massive form, say, for example, as a single large sintered block. The charge should be loose so that it will fall freely on the surface of the molten slag and spread out thereupon to an extent commensurate with the angle of repose of the charge particles. By specifying that the charge should be "dry" we mean that it should not be added in the molten condition. It is a characteristic feature of the smelting method of our invention that the charge be smelted out of contact with the furnace arcs, and this condition can be met only when the charge is introduced into the furnace in the aforementioned loose dry form.

Our new process has been used successfully in large scale operations for the production of collectible zinc metal. For example, in the course of a 45 day run, 340,117 pounds of a zinciferous furnace fume containing 68.4% Zn and 0.80% Fe in the form of the oxides of these metals were smelted in a 500 kw. three-phase electric arc furnace. The finely divided zinciferous furnace fume was pelletized, calcined, and mixed with No. 3 Buckwheat anthracite coal to form a charge mixture containing sufficient carbon to reduce at least 95% of the zinc oxide present in the charge to metallic zinc. The charge mixture was introduced into the furnace through charging holes about the periphery of the furnace roof so that a sloping bed of charge was formed adjacent the interior walls of the furnace. The graphite electrodes of the furnace were disposed in the central region of the furnace so that the electric arcs were out of direct contact with the unreduced charge. The average temperature of the slag throughout the 45 day period was about 1200° C. The slag tapped from the furnace during this period averaged 5.8% Zn, 16.1% FeO (calculated as Fe) and had an average lime:silica ratio of 0.61:1. No appreciable amount of metallic iron was produced during the test, and the yield of 224,649 pounds of slab zinc obtained by condensing the zinc vapor produced in the furnace represented a recovery of 95% of the zinc component of the charge.

It will be appreciated that the method of our invention makes possible the smelting of relatively high zinc-content zinciferous materials without requiring the presence of enough iron oxide in the charge to maintain temperature-buffering conditions by virtue of its endothermic heat of reduction. Our experience has indicated that the slags produced by the practice of the present invention will contain around 5 to 10% zinc, and sometimes somewhat more zinc, but the amount of slag produced by the smelting operation is so small compared to the zinciferous content of the charge that the zinc content of the slag represents a very small percentage of the zinc content of the charge. For example, in the smelting of a sintered Waelz oxide charge containing about 70% zinc (calculated as Zn), the presence of 3% by weight of zinc in the slag corresponds to 99.6% elimination of the zinc content of the charge in the form of zinc vapor, and the presence of as much as 10% zinc in the slag indicates a 98.2% zinc elimination from the charge. Accordingly, the zinc content of the slags produced in the practice of the present invention, while it may appear to be rather high, is nevertheless of such little value with respect to the over-all zinc elimination from the charge that no precautions need be taken to further lower the zinc content of the slag as formed during the smelting operation. The resulting disregard for attempted recovery of zinc from the slag enhances the quality of the zinc vapor-containing smelting gases and makes it possible to condense this zinc vapor predominantly to molten metal without the formation of prohibitive quantities of zinc dust or blue powder.

This application is a continuation-in-part of our co-pending application Serial No. 304,202, filed August 13, 1952, now abandoned.

We claim:

1. The method of smelting a charge containing an oxidic iron-bearing zinciferous material and solid carbonaceous reducing material, in which charge the zinc content of the zinciferous material (calculated as Zn) is at least 50% by weight and the iron oxide component of the charge (calculated as Fe) constitutes up to 25% by weight of the total of non-zinciferous slag-forming constituents in the charge, which comprises admixing said zinciferous material with an amount of the reducing material sufficient to effect reduction of at least 90% of the zinc oxide component of the zinciferous material to metallic zinc but insufficient to reduce the iron oxide to a collectible molten metallic iron product, incorporating in the charge an amount of an extraneous fluxing agent of the group consisting of lime and silica sufficient to establish in the slag-forming constituents of the charge a lime:silica ratio within the range of about 0.6:1 to 1:1, charging the resulting mixture to an electric arc furnace, and smelting the charge mixture out of direct contact with the furnace arc with the resulting production of a molten slag containing up to 25% by weight of ferrous oxide (calculated as Fe) and evolution of metallic zinc vapor capable of being condensed predominantly to molten zinc.

2. The method of smelting a charge containing an oxidic iron-bearing zinciferous material and solid carbonaceous reducing material, in which charge the zinc content of the zinciferous material (calculated as Zn) is at least 65% by weight and the iron oxide component of the charge (calculated as Fe) constitutes from 5 to 20% by weight of the total of non-zinciferous slag-forming constituents in the charge, which comprises admixing said zinciferous material with an amount of the reducing material sufficient to effect reduction of at least 95% of the zinc oxide component of the zinciferous material to metallic zinc but insufficient to reduce the iron oxide to a collectible molten metallic iron product, incorporating in the charge an amount of an extraneous fluxing agent of the group consisting of lime and silica sufficient to establish in the slag-forming constituents of the charge a lime:silica ratio within the range of about 0.6:1 to 1:1, charging the resulting mixture to an electric arc furnace, and smelting the charge mixture out of direct contact with the furnace arc with the resulting production of a molten slag containing from 5 to 20% by weight of ferrous oxide (calculated as Fe) and evolution of metallic zinc vapor capable of being condensed predominantly to molten zinc.

3. The method of producing molten zinc metal directly from a charge containing an oxidic iron-bearing zinciferous material and solid carbonaceous reducing material, in which charge the zinc content of the zinciferous material (calculated as Zn) is at least 50% by weight and the iron oxide component of the charge (calculated as Fe) constitutes up to 25% by weight of the total of non-zinciferous slag-forming constituents in the charge, which comprises forming said charge by admixing said zinciferous material with an amount of reducing material sufficient to effect reduction of at least 90% of the zinc oxide component of the zinciferous material to metallic zinc but insufficient to reduce the iron oxide to a collectible molten metallic iron product, incorporating in the charge an amount of an extraneous fluxing agent of the group consisting of lime and silica sufficient to establish in the slag-forming constituents of the charge a lime:silica ratio within the range of about 0.6:1 to 1:1, charging the resulting mixture to an electric arc furnace, smelting the charge mixture out of direct contact with the furnace arc with the resulting production of a molten slag containing up to 25% by weight of ferrous oxide (calculated as Fe) and evolution of metallic zinc vapor capable of being condensed predominantly to molten zinc, and condensing the evolved zinc vapor to molten metal.

References Cited in the file of this patent

UNITED STATES PATENTS

| Number | Name | Date |
|---|---|---|
| 1,150,271 | Johnson | Aug. 17, 1950 |
| 2,598,743 | Waring et al. | June 3, 1952 |
| 2,598,744 | Handwerk et al. | June 3, 1952 |